Aug. 23, 1932.  H. G. MOJONNIER  1,873,588
LIQUID TREATING APPARATUS
Filed April 3, 1931   2 Sheets-Sheet 2
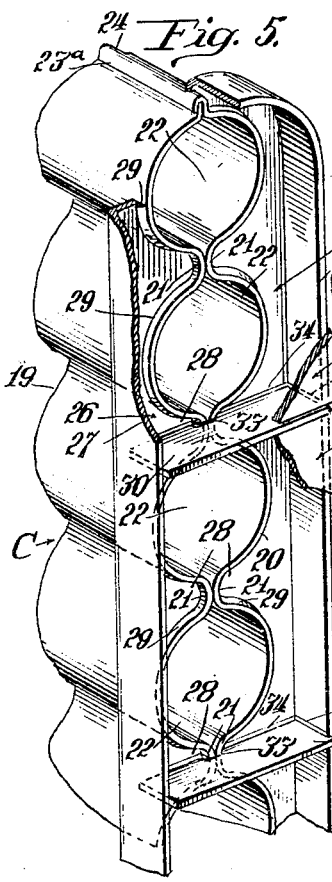
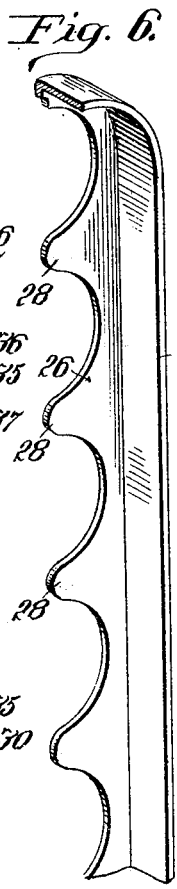
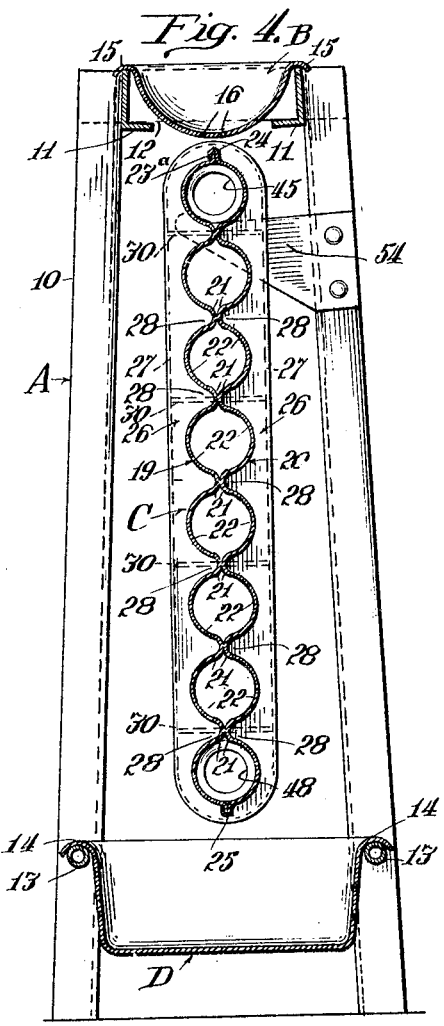
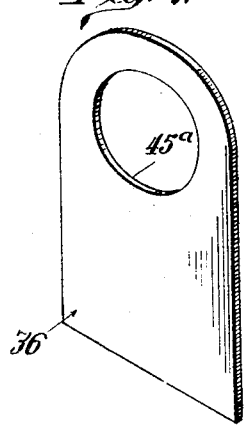
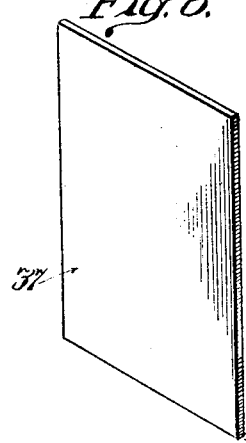
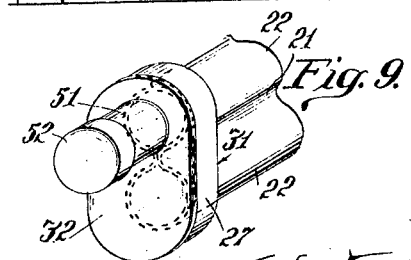
Inventor
Harry G. Mojonnier
By Thomas H. Ferguson
Attorney Patented Aug. 23, 1932

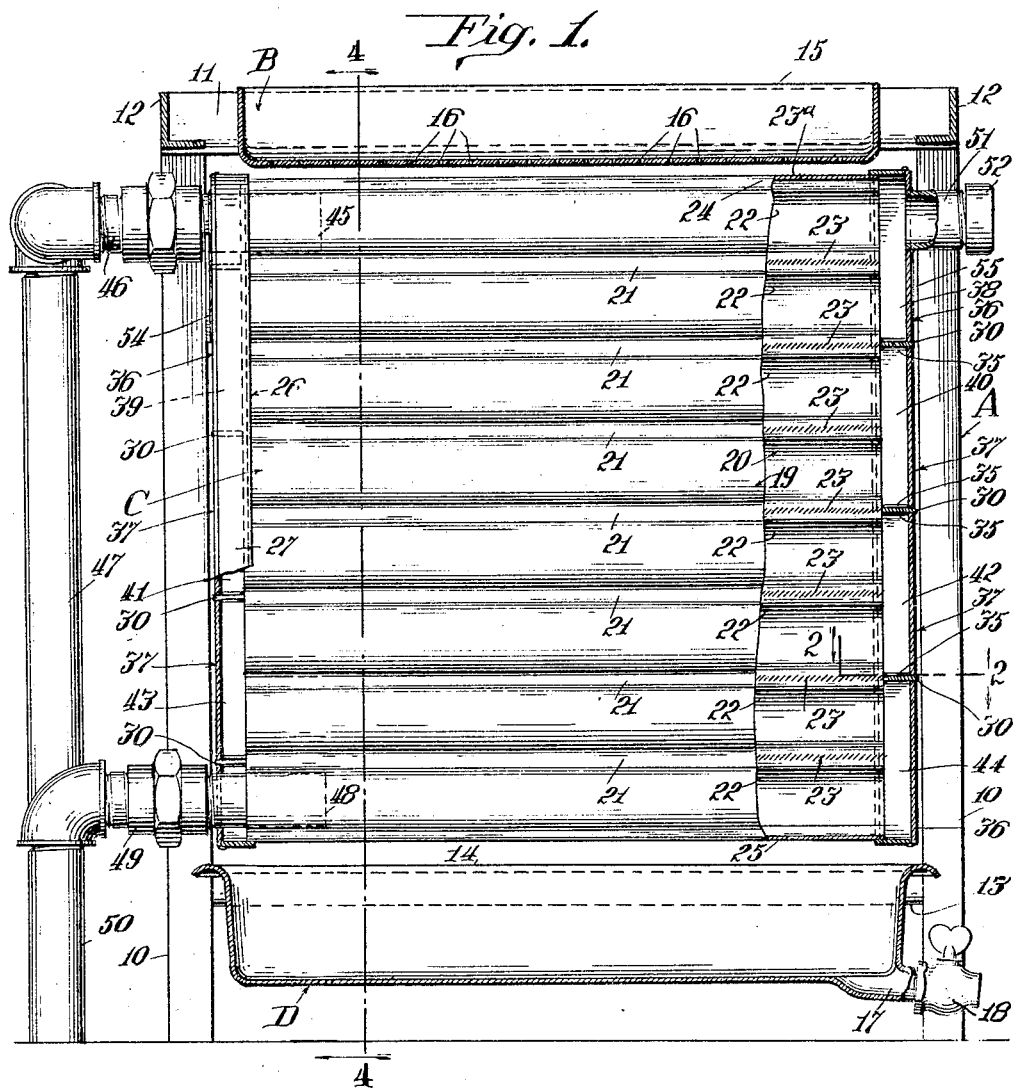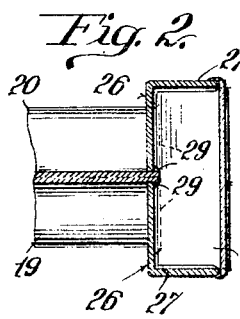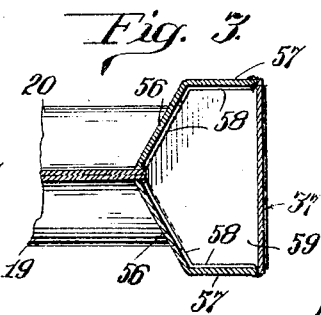

1,873,588

UNITED STATES PATENT OFFICE

HARRY G. MOJONNIER, OF OAK PARK, ILLINOIS, ASSIGNOR TO MOJONNIER BROS. CO., A CORPORATION OF ILLINOIS

LIQUID TREATING APPARATUS

Application filed April 3, 1931. Serial No. 527,437.

The present invention relates to liquid treating apparatus generally and has to do more particularly with apparatus of this kind which will meet the requirements of heaters, coolers, and the like, in the milk industry, although the features of construction may also be used to advantage in other industries.

One object of the invention is to so construct the parts that the finished product will be especially sanitary.

Another object is to provide such a construction that relatively thin metal may be used for the heat transmission, whether for cooling or heating.

Another object is to provide a novel construction that lends itself particularly to the employment of stainless steel as the heat transmitting metal with which the liquid comes in contact.

Other objects are to provide (1) a construction that will allow for the flow of the active conditioning fluid in opposite directions in adjacent pipes or passages with full efficiency, (2) a construction that may be made up into long and short lengths with equal facility and advantage, and (3) a construction that will be strong, durable and efficient in operation, while being reasonably economical to manufacture.

In carrying out these objects, I have produced a novel construction wherein the central heat transferring member and its headers are united in such a way that the joining of the parts is made at each end on the header side away from the surfaces over which the liquid to be treated flows. The various parts are joined together by welding, preferably arc welding.

The novel arrangement of the header parts and the parts joined thereto make it possible to use relatively thin metal and still to obtain tight joints by welding.

By employing the construction which I have devised, it is now possible to use stainless steel, stainless iron, and like materials, in the manufacture of milk heaters and milk coolers of the surface type. So far as I am aware, this has not been possible heretofore.

The several features and advantages of the invention will be more fully understood upon reference to the following detailed description taken in connection with the accompanying drawings, while the scope of the invention will be particularly pointed out in the appended claims.

In said drawings, Fig. 1 is a side elevation of a liquid treating apparatus constructed and arranged in accordance with the present invention, certain of the parts being broken away and other parts being shown in central vertical section; Fig. 2 is a horizontal section through one header and a portion of the adjacent central member, the plane of section being indicated by the line 2—2 of Fig. 1; Fig. 3 is a view similar to Fig. 2, illustrating a modification wherein the inner header walls are inclined to the axes of the tubular passages of the central member; Fig. 4 is a transverse vertical section through the apparatus, the plane of section being indicated by the line 4—4 of Fig. 1; Fig. 5 is a fragmentary perspective view illustrating one end of the structure with portions of the header in position and portions broken away for clearness; Fig. 6 is a perspective view of a portion of one of the inner header plates which fit against the corrugations of the central member; Fig. 7 is a perspective view of one of the end header plates; Fig. 8 is a similar view of an intermediate header plate; and Fig. 9 is a perspective view of a portion of a modification wherein the entire header is closed by a single end plate. Throughout these views like characters refer to like parts.

Referring to said drawings in detail, A designates the main supporting frame; B, the upper receptacle into which the liquid to be treated is poured, C, the treating element over which the liquid to be treated passes and through the interior of which the conditioning fluid (gas or liquid) flows to supply the necessary heat or cold, and D, the receiving receptacle into which the treated liquid passes and over which it may be withdrawn, as desired.

The frame A may be made up in any suitable way, and in the present instances includes inclined uprights 10, upper longitudinal members 11, upper transverse members 12, and lower longitudinal members 13. The latter members are preferably tubular and receive the turned lips 14 of the receptacle D. The other members are preferably angle irons, properly cut and secured together, as by welding.

The upper receptacle B may also have any desired construction, and in the instance shown is in the form of an elongated basin having longitudinal lips 15 which overhang and rest upon the longitudinal frame members 11. The bottom of the receptacle B is perforated at a number of points to provide small outlet openings 16 through which the liquid to be treated may pass in small streams into contact with the conditioning member C directly beneath the receptacle B.

As before noted, the receiving receptacle D has the supporting lips 14, and it is also preferably given a somewhat larger capacity than the receptacle B. It receives the treated liquid and holds it, or guides it through the outlet tubular connection 17, controlled by a valve 18.

Obviously, any way of supplying the liquid to the conditioning element C and catching it after it has left that element, may be employed. The receptacles B and D are merely typical and suggestive of elements which may be used for this purpose.

The liquid conditioning member C is made up of two corrugated plates 19, 20 which have the same general dimensions and have corrugations of the same size and arrangement. The two plates 19 and 20 are placed together so that the lowermost or valley portions 21 of the corrugations contact each other and thus provide a series of tubular openings 22 through which the active conditioning fluid is adapted to pass. The plates 19 and 20 are forced into intimate engagement along the valley portions 21, and while thus held are welded together, preferably by a suitable electric welder. The welds, designated 23, are shown more particularly in Fig. 1 where a portion of the plate 19 is cut away from the plate 20. Preferably, the welds are seam welds, rather than spot welds, in order to insure tight joints and thus prevent leakage between one or more of the tubes 22. In some constructions, however, this may not be so important and spot welding may suffice.

The constituent plates 19 and 20 are, of course, properly secured together along their top and bottom edges 24, 25. In the embodiment shown, the plate 20 is somewhat longer than the plate 19 and has its upper and lower flanges bent over the shorter flanges upon the plate 19. The interfitting flanges are then preferably welded as indicated by the added material 23$^a$. Obviously any other way of providing tight joints along these assembled flanges would suffice, but the construction shown makes it a satisfactory one to be employed with many metals. If the metal can not be turned as sharply as indicated, then the parts might obviously be welded together without having one flange turned over the other.

The header at each end of the plates 19, 20 comprises an inner header plate 26 having a peripheral flange 27 and an inner edge cut so as to fit against the associated corrugated plates 19, 20. The scalloped edge thus provided, with its series of tongues 28, must fit closely against the surfaces of the plates 19, 20 so as to be secured thereto with a tight joint throughout. This joint is provided by arc welding the metal of the inner wall 26 to the metal of the plates 19, 20 near the ends of the latter. In the case shown, the metal 29, which has been added by the welding, is somewhat regularly disposed along the joining edge of the plate 26, where the latter comes in contact with the plates 19, 20. In actual practice, it may occur that the ends of the plates around the tubular passages 20 will be considerably more broken down by the welding operation than shown. But, in any event, the joint formed must be tight.

It should be particularly noted that all this header arc welding is performed from the header side, and nothing is done to roughen the smooth surface either of the plate 26, or of the plates 19, 20, over which the treated liquid passes. Any roughness that may occur will be located inside of the header chambers which connect the adjacent passage 22. Consequently the rough surfaces will be those surfaces which are engaged by the water, steam, ammonia, or other conditioning fluid which passes through the interior of the member C.

Having completed the operation of securing the inner header plate 26 in position upon the tubular plates 19, 20, the next step is to place the partition plates 30, unless it be that the tubular passages are few in number, and there is to be but a single closing plate without partition plates. Such an embodiment of the invention is shown in Fig. 9, where the header member 31 is used with a single closing plate 32. In that embodiment, there are but two tubular passages 22 and they are placed in communication with each other by the header having the single closing plate 32 without partitions.

Assuming that partitions 30 are to be used, then they are cut to fit between the flanges 27 and to abut against the wall of the plate 26, while projecting slightly beyond the outer edges of the flanges 27, as clearly illustrated. In some instances, it may also be desirable to provide the center of the partitions 30 with a notch 33 so as to fit over the plates 19, 20 at their valley portions 21. When the partition plates 30 are thus accurately fitted, they are welded in place in the same manner as before described, the welding being indicated at 34, 35. In every instance, it is important that the joint formed be tight. The joining of the partitions to the header plate 26 and its flange 27 is brought about by work upon the header side, just as when the header plate 26 was applied to the corrugated plates. Thus, again, all work is kept away from the surfaces of the apparatus which are to receive the liquid under treatment.

When it comes to placing the final closing plates in that structure where partitions are employed, the end plates, such as the plate 36, are rounded at one end so as to fit over the curved ends of the flange 27 of the inner header plate 26, and squared at the other end to abut against the projecting edge of the adjacent partition 30. The plates 37 which lie between the partitions 30 are wide enough to overlap and rest upon the edges of the flanges 27 and at their ends abut against the overhanging edges of the partitions, just as in the case of the plate 36. When these parts are thus assembled, they are ready for welding, and the arc for accomplishing same is applied along the edges of the plates to join them to the flanges 27 and the partitions 30. This welding is from the outside and completes the joining of the various plates of the header.

Where a single plate, such as 32, suffices to complete the closing of the header, the plate is cut so as to fit over the flange of the header plate, as the plate 31. The welding is the same as in the case of the sectional closing plates.

With both ends of the tubes of the central member C provided with headers of the kind described, it is obvious that the partitions 30, where employed, at the two ends must be staggered with relation to each other in order to provide for a continuous passage back and forth through the liquid conditioning member. In the embodiment illustrated in Fig. 1, the partitions 30 are so located that fluid admitted to the upper passage 22 at the left will pass through the same to the chamber 38 at the right, thence back through the second passage 22 to the chamber 39 at the left, thence through the third passage 22 to the chamber 40 at the right, thence through the fourth passage 22 to the chamber 41 at the left, and so on through the additional chambers 42, 43, and 44, to the lowermost passage 22, out of which it passes at the left.

A length of pipe 45 passes into the upper chamber 22 through an opening, such as the opening 45ᵃ, in the uppermost closing header plate, and is suitably secured therein by welding, or otherwise. Its outer end is provided with pipe connections 46 which places it in communication with a supply pipe 47. A similar length of pipe 48 is similarly positioned with reference to the lowermost passage 22, and through pipe connections 49 communicates with a discharge pipe 50. The uppermost header closing plate at the right of the structure is also provided with an opening into which a short piece of pipe 51 is introduced and to which it is secured in any suitable way, as by welding. The outer end of this pipe 51 is closed by a cap 52 which is threaded on to the end of the pipe 51. The same structure is shown in the embodiment illustrated in Fig. 9.

The pipe 51 and the inlet pipe 45 are in alignment and serve as supporting trunnions for the central member C. The trunnions thus formed rest upon brackets 54, 55, which extend from uprights 10 of the main frame structure, as clearly illustrated in Fig. 4.

The active conditioning fluid passes up through pipe 47 and into the member C and thence through its several communicating passages to the outlet pipe 50. In the meantime, the liquid to be treated is furnished by the supply receptacle B and passes through its openings 16 down over the exterior of the member C and finally into the receiving receptacle D. As the liquid passes down over the surface of the member C, it is supplied with heat or cold as required by the particular liquid under treatment. In this downward flow of the liquid, there are practically smooth surfaces only with which it comes in contact. The surfaces are also such that they may be easily cleaned off and thus kept in good sanitary condition. All roughness of metal in the header formation has been kept away from these treating surfaces. As a result, an efficient and satisfactory device has been provided, especially for the handling of milk, whether it be for heating the same or cooling the same after it has been heated. When milk is to be treated, the fluid passes through the member C is commonly hot or cold water, brine, or ammonia.

In some installations, it is desirable to keep the angle between the header walls and the walls of the corrugated sheets of the member C, as flat as possible. In the structure heretofore described, these parts have met at approximately a right angle, as clearly shown in Fig. 2. Obviously, the inner header wall or plate 26 might be replaced by an inner wall 56 shown in Fig. 3, formed similarly to the walls 26 but having longer tongue portions and having flanges 57 which meet the wall portions at an obtuse angle. In such case, the securing of the wall 56 to the corrugated plates 19, 20 would be accomplished by welding as before, but the metal of the ends of the plates would preferably be cut away or welded down so as to lie near to the walls 56 in the manner clearly indicated in Fig. 3, where the welding materials 58 extend along the walls 56 and flanges 57. The partitions 59, corresponding to the partitions 30, are modified in outline so as to agree with the change in shape of the associated header chamber. Otherwise, these partitions 59 are like the partitions 30. They are put in place in the same way and perform the same functions.

Obviously in carrying out my invention, other changes than those indicated might readily be made without departing from the spirit and scope of the invention. I therefore do not wish to be limited to the exact matters disclosed, but aim to cover by the terms of the appended claims all those alterations and modifications which rightly come within the scope and spirit of my invention.

It should also be noted that the word fluid, used herein, includes both a gas and a liquid. Sometimes the one fluid, as ammonia, appears in both the gaseous and liquid states in the one cycle. The loose use of the word fluid limiting it to a liquid only, is not intended.

I claim:

1. Liquid treating apparatus of the class described including a pair of corrugated plates forming the outer undulating surfaces of a central member over which the liquid to be treated passes, said member having an inner passage through which the active conditioning fluid passes, and headers for said central member, each header comprising an inner header plate fitted to the corrugations of said plates and welded to said plates on the header side, and an outer header plate fitted to said inner header plate and welded thereto on the outside, all of said header joints being liquid tight.

2. Liquid treating apparatus of the class described including a pair of corrugated stainless steel plates over which the liquid to be treated passes and between which the active conditioning fluid passes and headers for said plates, each header comprising an inner header plate fitted to the outer corrugated surfaces of said steel plates and welded thereto on the header side, and an outer header plate welded to said inner header plate on the outside.

3. Liquid treating apparatus of the class described including a pair of corrugated stainless steel plates over which the liquid to be treated passes and between which the active conditioning fluid passes and headers for said plates, each header comprising an inner header plate fitted to the outer corrugated surfaces of said steel plates and welded thereto on the header side, cross partitions welded to said inner header plate from the header side, and outer closing header plates welded to said inner header plate and to said partitions from the outside of said header.

4. Liquid treating apparatus of the class described including a central member having outer stainless steel undulating surfaces and inner transverse parallel tubular passages, said apparatus including also headers for said central member to provide circulatory connections between said passages, each of said headers comprising an inner plate fitted to the undulating surfaces of said central member and welded thereto from the header side, cross partitions welded to said inner member from the header side, and closing plates welded to said inner plate and to said partitions from the outside of said header.

5. Liquid treating apparatus of the class described including a central member having outer stainless steel undulating surfaces and inner transverse parallel tubular passages, said apparatus including also headers for said central member to provide circulatory connections between said passages, each of said headers comprising an inner plate fitted to the undulating surfaces of said central member and welded thereto from the header side, and a closing outer plate welded to said inner plate from the outside of said header.

6. A liquid treating apparatus of the class described including a central member having outer undulating surfaces over which the liquid to be treated passes and an inner passage through which the active conditioning fluid passes, and headers for said central member, each header comprising spaced inner and outer plates, said inner header plates being scalloped along adjacent edges to fit against the undulating surfaces of said central member and being fitted and joined thereto short distances inward from the ends of the same, said joinings being provided between the outer surfaces of said inner plates and the outwardly projecting ends of the said central member, and said outer header plates being fitted to said inner header plates and suitably secured thereto, the latter joinings being positioned on the outside of the headers away from the undulating surfaces of said central member, all of said joints being liquid tight.

HARRY G. MOJONNIER.